US012747031B2

(12) United States Patent
Au

(10) Patent No.: US 12,747,031 B2
(45) Date of Patent: Sep. 29, 2026

(54) DETERMINING A POSITION OF A COMPONENT OF AN AIRCRAFT LANDING GEAR ASSEMBLY

(71) Applicant: AIRBUS OPERATIONS LIMITED, Bristol (GB)

(72) Inventor: Ting Yu Au, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 304 days.

(21) Appl. No.: 18/425,873

(22) Filed: Jan. 29, 2024

(65) Prior Publication Data

US 2024/0253817 A1 Aug. 1, 2024

(30) Foreign Application Priority Data

Jan. 31, 2023 (GB) ..................................... 2301381

(51) Int. Cl.
*B64D 45/00* (2006.01)
*G06T 7/246* (2017.01)
(Continued)

(52) U.S. Cl.
CPC .......... *B64D 45/0005* (2013.01); *G06T 7/248* (2017.01); *G06T 7/74* (2017.01); *G06V 10/25* (2022.01)

(58) Field of Classification Search
CPC ........... G06T 7/248; G06T 7/74; G06T 7/246; G06T 7/73; G06T 7/0002; G06T 7/66; G06T 2207/10016; G06T 2207/30164; B64D 45/0005; B64D 2045/0085; B64D 47/08; B64C 25/16; B64C 25/10; B64C 25/26; G06V 10/25; G06V 10/80; G06V 10/40; G06V 10/746; G06V 10/764;
(Continued)

(56) References Cited

U.S. PATENT DOCUMENTS

2017/0334578 A1* 11/2017 Fleck ..................... B64D 47/08
2022/0332437 A1 10/2022 Shapoury et al.

FOREIGN PATENT DOCUMENTS

CN 115471456 A * 12/2022 ............... G06T 7/70
GB 2563851 A * 1/2019 ............. B64C 25/14
GB 2587416 A * 3/2021 ............. G01S 17/88

OTHER PUBLICATIONS

Tang M, Fang W, Yan W et al (2021) Research on algorithm of fighter landing gear in bad video image. J Phys Conf Ser 2024(1): 012008. https://doi.org/10.1088/1742-6596/2024/1/012008 (Year: 2021).*

(Continued)

*Primary Examiner* — Chan S Park
*Assistant Examiner* — Paulo Andres Garcia
(74) *Attorney, Agent, or Firm* — Nixon & Vanderhye P.C.

(57) ABSTRACT

A computer-implemented method of determining a position of a component of an aircraft landing gear assembly. The method includes obtaining an image of the aircraft landing gear assembly; determining a region of interest within the image, the region of interest contains the component of the aircraft landing gear assembly; calculating a coordinate of a centroid of the bounding box and comparing the coordinate of the centroid to a corresponding predetermined threshold coordinate to determine the position of the component of the aircraft landing gear assembly.

19 Claims, 5 Drawing Sheets

(51) Int. Cl.
*G06T 7/73* (2017.01)
*G06V 10/25* (2022.01)

(58) Field of Classification Search
CPC .... G06V 2201/07; G06V 20/44; G06V 20/58; G06V 20/60
See application file for complete search history.

(56) References Cited

OTHER PUBLICATIONS

J. Hang and Z. Wei, “Dynamic Up-Sampling Network for Small Airplane Landing Gear Detection,” in IEEE Access, vol. 7, pp. 98405-98419, 2019, doi: 10.1109/ACCESS.2019.2929940. (Year: 2019).*

Z. Rahman, A. M. Ami and M. A. Ullah, “A Real-Time Wrong-Way Vehicle Detection Based on YOLO and Centroid Tracking, ” 2020 IEEE Region 10 Symposium (TENSYMP), Dhaka, Bangladesh, 2020, pp. 916-920, doi: 10.1109/TENSYMP50017.2020.9230463. (Year: 2020).*

Li, F.; Wu, Z.; Li, J.; Lai, Z.; Zhao, B.; Min, C. A Multi-Step CNN-Based Estimation of Aircraft Landing Gear Angles. Sensors 2021, 21, 8440. https://doi.org/10.3390/s21248440 (Year: 2021).*

Zhang, W.; Chen, X.; Shi, B.; Li, Y. A Dynamic Pose-Testing Technique of Landing Gear Combined Stereo Vision and CAD Digital Model. Sensors 2025, 25, 6715. https://doi.org/10.3390/s25216715 (Year: 2025).*

Combined Search Report and Examination Report for GB2301381.6 dated Jul. 18, 2023, 4 pages.

“Challenges and Opportunities of Computer Vision Applications in Aircraft Landing Gear”, 2022 IEEE Aerospace Conference, Mar. 5, 2022 (10 pages).

European Apln 24154839.5, Extended European Search Report (Jun. 6, 2024)(8 pages).

* cited by examiner

DETERMINING A POSITION OF A COMPONENT OF AN AIRCRAFT LANDING GEAR ASSEMBLY

RELATED APPLICATION

This application incorporates by reference and claims priority to United Kingdom patent application GB 2301381.6, filed Jan. 31, 2023.

TECHNICAL FIELD

The present invention relates to a computer-implemented method and system of determining a position of a component of an aircraft landing gear assembly, an aircraft controller, a non-transitory computer-readable storage medium and an aircraft.

BACKGROUND

During operation of an aircraft, it may be desirable to know the position of a component of an aircraft landing gear assembly. The position of the component of the aircraft landing gear assembly may be provided to a pilot to allow the pilot to make decisions and/or take actions dependent on the position.

SUMMARY

A first aspect of the present invention provides a computer-implemented method of determining a position of a component of an aircraft landing gear assembly, the method comprising: obtaining an image of the aircraft landing gear assembly; determining a region of interest within the image, the region of interest containing the component of the aircraft landing gear assembly; calculating a coordinate of a centroid of the region of interest; and comparing the coordinate of the centroid against a corresponding predetermined threshold coordinate to determine the position of the component of the aircraft landing gear assembly.

Determining the position of the component of the aircraft landing gear assembly using the method of the first aspect may allow the position of the component to be determined in a non-intrusive manner, i.e. without physical interaction between a sensor and the aircraft landing gear assembly. This may help to reduce the number of sensors present in the aircraft landing gear assembly and may also reduce the need for physical interaction between sensors and the aircraft landing gear assembly. The predetermined threshold coordinate may be associated with a known position of the component. For example, if the coordinate of the centroid is at or exceeds the predetermined threshold coordinate, this may indicate that the component is in a certain position. The region of interest may contain the entire component, or may contain a portion of the component.

The computer-implemented method may comprise obtaining a plurality of images of the aircraft landing gear assembly in operation, and tracking movement of the region of interest between the plurality of images. This may allow movement of the component of the aircraft landing gear assembly to be monitored, which may help to monitor the health of the component and/or the aircraft landing gear assembly. For example, it may be easier to see if the aircraft landing gear assembly is moving as expected compared to the use of proximity sensor which can only determine if a component is at a location or not. The movement of the region of interest may be tracked using an object tracking algorithm, such as a CSRT (Discriminative Correlation Filter with Channel and Spatial Reliability) tracker. Tracking movement of the region of interest between the plurality of images may comprise tracking movement of the coordinate of the centroid between the plurality of images. The coordinate of the centroid of each image of the plurality of images may be compared against the predetermined threshold coordinate to determine the position of the component of the aircraft landing gear assembly in each image of the plurality of images.

The position of the component of the landing gear may comprise at least one of: an extended position, a retracted position, an open position, a closed position, a locked position, or an unlocked position. The position of the component of the aircraft landing gear assembly may be used to determine whether the aircraft landing gear assembly is in the correct configuration for different stages of flight. For example, to ensure that the aircraft landing gear is extended for landing or retracted for cruise.

The component of the aircraft landing gear assembly may comprise at least one of: a torque link, a tyre, a landing gear bay door, or a lock. The position of the torque link or the tyre may be indicative of whether the landing gear assembly is in the extended position or the retracted position, such that determining the position of the torque link or the tyre may be used to determine whether the landing gear assembly is in a retracted or an extended state. The position of the torque link may be more easily visible from a single position within a landing gear bay, as compared, for example, to the tyre which may be occluded by other parts of the landing gear assembly when in the extended position.

The position of the landing gear bay door may be indicative of whether the landing gear bay door is in the open position or in the closed position. For example, if the coordinate of the centroid of the region of interest containing the landing gear bay door exceeds the predetermined threshold coordinate, the landing gear bay door may be in the closed position. By determining the position of the landing gear bay door, it can be determined whether the landing gear bay door is in the correct position to allow the aircraft landing gear to be extended and/or retracted, or if the landing gear bay door is in the correct position for flight.

The position of the lock may be used to determine whether the aircraft landing gear assembly is locked in position or not. For example, if the coordinate of the centroid of the region of interest containing the lock exceeds the predetermined threshold coordinate, the lock may be in the locked position. This may also help to determine if a lock has failed when the lock is not in a position that is expected.

The method may comprise forming a bounding box around the region of interest. The bounding box may be tracked using an object tracking algorithm (such as a CSRT tracker) to track movement of the component of the aircraft landing gear assembly 10. Calculating the coordinate of the centroid of the region of interest may comprise calculating a coordinate of a centroid of the bounding box.

Obtaining the image of the aircraft landing gear assembly may comprise obtaining the image using a digital camera. The digital camera may be positioned within a landing gear bay. The digital camera may also be used for other purposes in addition to determining the position of the component of the aircraft landing gear assembly, such as determining whether there are obstructions/foreign objects within the landing gear bay. Using a single device for multiple purposes may help to reduce the total number of devices required to be present in the aircraft landing gear bay, which may reduce complexity and reduce the total weight of components in the landing gear bay (and therefore the overall weight of the aircraft).

Obtaining the image of the aircraft landing gear assembly may comprise scanning the aircraft landing gear assembly with an imaging device to determine a set of position data points indicative of a distance that features of the aircraft landing gear assembly are from the imaging device. The position data points may provide position data of the component of the aircraft landing gear assembly (such as coordinates of the components), which may help to improve accuracy of the determination of the position of the component of the aircraft landing gear assembly.

Determining the set of position data points may comprise scanning the aircraft landing gear using a lidar system to determine the set of position data points. The image obtained by the lidar system may not be affected by certain external factors (such as lighting conditions), which may help to reduce the amount of processing of the image required. Alternatively, the determining the set of position data points may be comprise using radar, sonar, time-of-flight sensors or an ultrasonic rangefinding.

The computer-implemented method may comprise providing an indication of the position of the component of the aircraft landing gear assembly to an operator. The indication may take the form of a light in a cockpit of an aircraft. Alternatively or additionally, an indication may be shown on a screen within the cockpit, to inform a flight crew of the position of the component of the aircraft landing gear. This may allow the flight crew to be informed of the position of the component of the aircraft landing gear and take any necessary action. The indication may be that the component of the aircraft landing gear is not in a predetermined position.

The computer-implemented method may comprise storing data indicative of the determined position of the component of the landing gear on a local storage, and/or transmitting to the data to a remote location and/or storing the data at the remote location. This may allow the data to be accessed at a later point in time to analyse the operation of the aircraft landing gear assembly and/or the method.

The computer-implemented method may comprise controlling operation of an aircraft system based on the determined position of the component of the landing gear assembly. The aircraft system may be auxiliary/back-up system, such as an auxiliary hydraulic system which is configured to operate/move parts of the aircraft landing gear assembly.

The computer-implemented method may comprise, based on the determined position of the component of the aircraft landing gear assembly, determining remedial action to be taken and providing an indication of the remedial action to an operator. For example, if the aircraft landing gear is being deployed for landing, but the method determines that the aircraft landing gear is not in the extended position, remedial action may be determined to try and rectify this issue. For example, the remedial action may be to activate an auxiliary system to attempt to move the aircraft landing gear to the extended position, or to signal a go-around to the flight crew.

The computer-implemented method may comprise performing image pre-processing to the obtained image of the aircraft landing gear assembly. The image pre-processing may remove or reduce imperfections, or the effects of imperfections, in the obtained image. This may improve the quality of the image, which may improve the accuracy of the determination of the position of the component of the aircraft landing gear assembly. The image pre-processing may help to account for changes in light in the image (e.g. caused by runway lights) or may help to improve the clarity of an otherwise blurry image.

Performing the image pre-processing to the obtained image may occur before determining the region of interest. This may ensure that the image has a desired clarity before determining the region of interest within the image, which may increase the accuracy of the determination of the region of interest.

The image pre-processing may comprise at least one of: blurring, contrast limited adaptive histogram equalisation, sharpening, and denoising. Each of these image pre-processing steps may improve the quality of the image, which may improve the accuracy of the method.

Determining the region of interest may comprise using a machine learning model. The machine learning model may be trained on data from previous operations of the method to improve the accuracy of the determination of the region of interest. The machine learning model may receive the image of the aircraft landing gear assembly as an input and provide the region of interest as an output.

A second aspect of the present invention provides an aircraft controller configured to: obtain an image of the aircraft landing gear assembly; determine a region of interest within the image, the region of interest containing a component of the aircraft landing gear assembly; calculate a coordinate of a centroid of the region of interest; compare the coordinate of the centroid against a corresponding predetermined threshold coordinate to determine a position of the component of the aircraft landing gear assembly; and output an indication of the position of the component of the aircraft landing gear.

The aircraft controller may be configured to form a bounding box around the region of interest.

A third aspect of the present invention provides a system for determining a position of a component of an aircraft landing gear assembly, the system comprising: an imaging device; and an aircraft controller configured to: obtain an image of the aircraft landing gear assembly using the imaging device; determine a region of interest within the image, the region of interest containing the component of the aircraft landing gear assembly; calculate a coordinate of a centroid of the region of interest; and compare the coordinate of the centroid against a corresponding predetermined threshold coordinate to determine the position of the component of the aircraft landing gear assembly.

The imaging device may comprise a digital camera. The digital camera may capture a 2D image of the aircraft landing gear assembly. The digital camera may be positioned within a landing gear bay. The digital camera may also be used for other purposes in addition to determining the position of the component of the aircraft landing gear assembly, such as determining whether there are obstructions/foreign objects within the landing gear bay. Using a single device for multiple purposes may help to reduce the total number of devices required to be present in the aircraft landing gear bay, which may reduce complexity and reduce the total weight of components in the landing gear bay (and therefore the overall weight of the aircraft).

The imaging device may comprise a lidar system and the image comprises a set of position data points indicative of a position from the lidar system. The position data points may provide information of the position of the component within the region of interest. The image obtained by the lidar system may not be affected by external factors (such as lighting conditions), which may help to reduce the need for any processing of the image. Alternatively, the imaging device may utilise one or more of: radar, sonar, time-of-flight sensors or an ultrasonic rangefinding.

The aircraft controller may be configured to form a bounding box around the region of interest.

A fourth aspect of the present invention provides a non-transitory computer-readable storage medium storing instructions that, when executed by an aircraft controller, cause the aircraft controller to carry out the computer-implemented method according to the first aspect of the present invention.

A fourth aspect of the present invention provides an aircraft comprising the aircraft controller according to the second aspect of the present invention, the system according to the third aspect of the present invention, or the non-transitory computer-readable medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
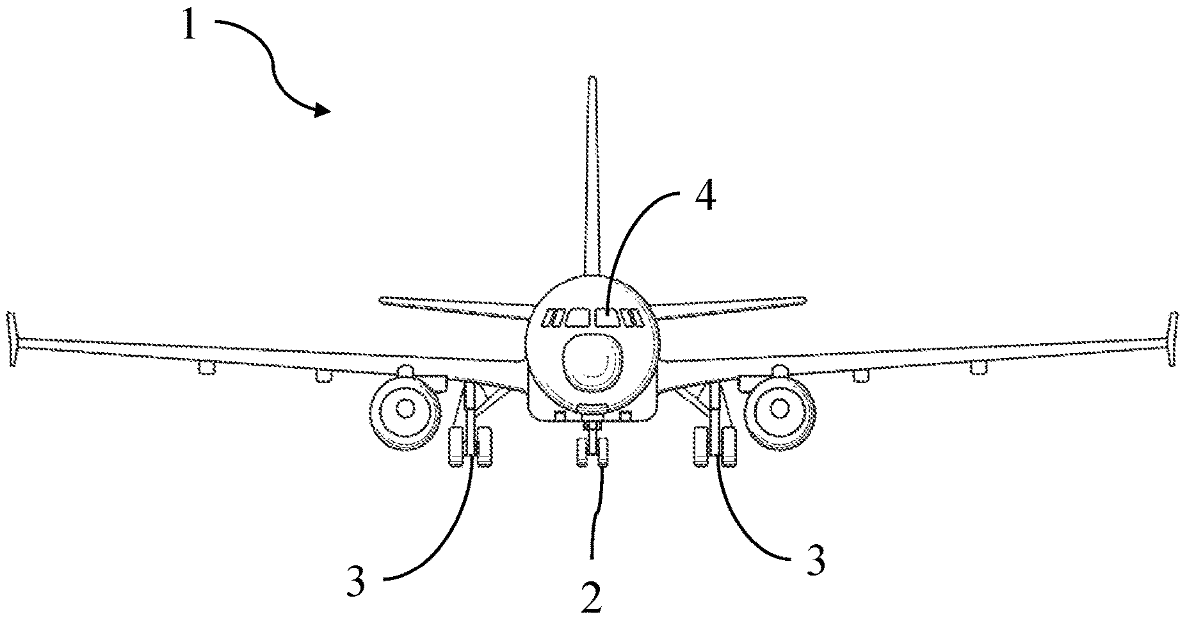
FIG. 1 shows a schematic view of an aircraft.

FIG. 1 shows a schematic view of an aircraft 1 according to an example. The aircraft 1 comprises a nose landing gear 2 and two sets of main landing gear 3. During operation of the aircraft, the nose landing gear 2 and the main landing gear 3 are moved between different positions depending on the stage of flight. For example, while the aircraft 1 in on the ground, the nose landing gear 2 and the main landing gear 3 are extended. When the aircraft 1 is off the ground, in particular when the aircraft 1 is at cruise, the nose landing gear 2 and the main landing gear 3 are retracted to improve aerodynamics of the aircraft. The aircraft 1 comprises a cockpit 4 from which a member of a flight crew, e.g. a pilot, controls the aircraft 1. The cockpit 4 comprises an interface, e.g. a joystick or dial, to control the position of nose landing gear 2 and/or the main landing gear 3, and a display to provide information about the position of the nose landing gear 2 and/or the main landing gear 3.

Figure 2:
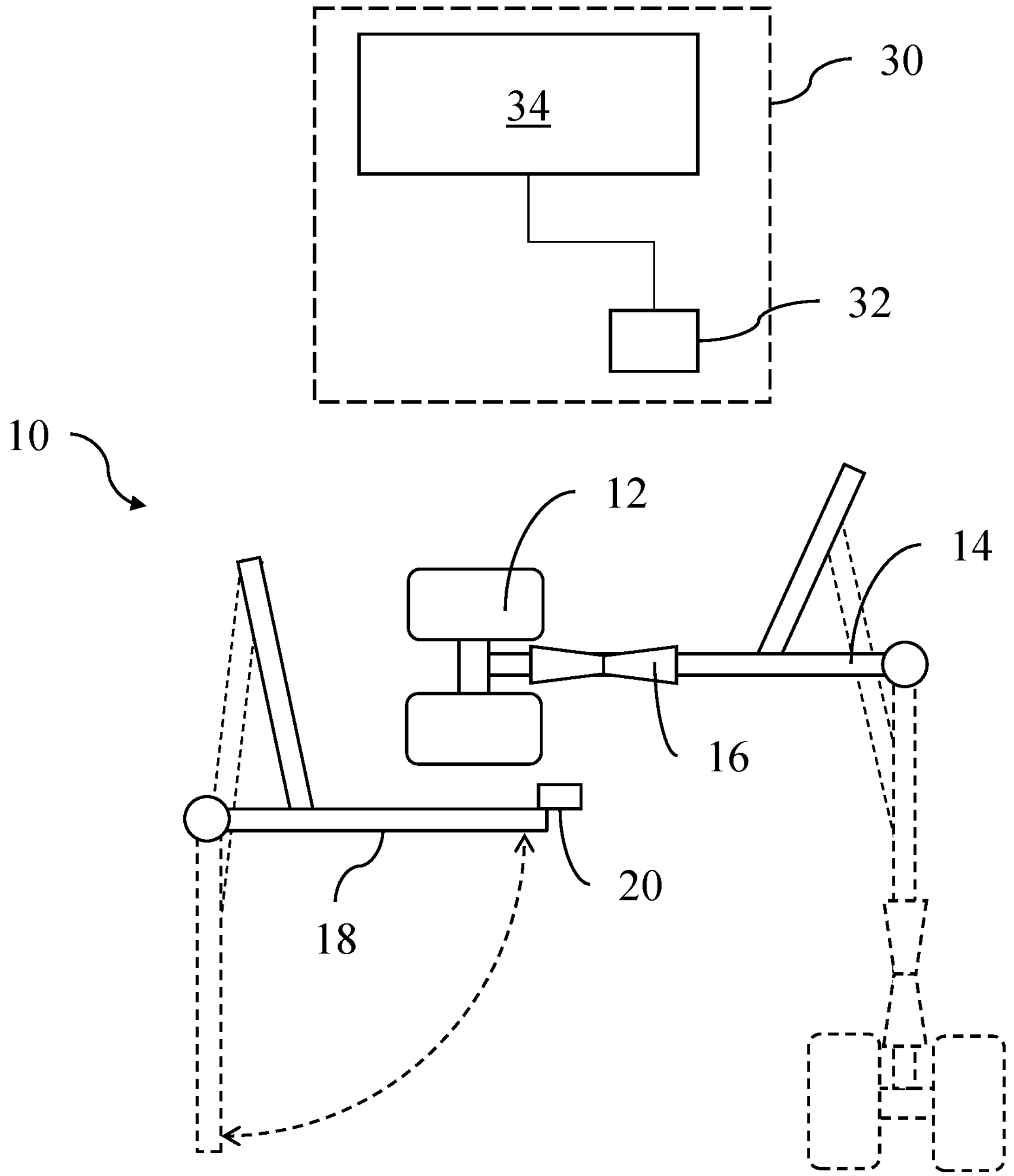
FIG. 2 shows a schematic view of an aircraft landing gear assembly.

FIG. 2 shows a schematic view of an aircraft landing gear assembly 10. The aircraft landing gear assembly 10 shown in FIG. 2 comprises the nose landing gear 2 of FIG. 1. In other examples, the aircraft landing gear assembly 10 comprises the main landing gear 3 of FIG. 1. The aircraft landing gear assembly 10 comprises two tyres 12, a strut 14, a torque link 16 (the tyres 12, the strut 14 and the torque link 16 forming part of the nose landing gear 2), a landing gear bay door 18 and a lock 20.

Also shown schematically in FIG. 2 is a system 30 for determining a position of a component of the aircraft landing gear assembly 10. The system 30 comprises an imaging device 32 and an aircraft controller 34. The imaging device 32 is positioned within a landing gear bay of the aircraft 1 and captures images of the aircraft landing gear assembly 10. The imaging device 32 shown in FIG. 2 comprises a digital camera. In other examples, as will be discussed further later, the imaging device 32 may comprise another suitable imaging device, such as a lidar system. The aircraft controller 34 of the system 30 is configured to carry out any method of determining the position of the component of the aircraft landing gear assembly 10 discussed herein.

The components of the aircraft landing gear assembly 10 are configured to move in use, as indicated by the dashed lines in FIG. 2. The tyres 12, the strut 14 and the torque link 16 are movable between a retracted position (illustrated by solid lines in FIG. 2) and an extended position (illustrated by dashed lines in FIG. 2), the landing gear bay door 18 is movable between an open position (illustrated by dashed lines in FIG. 2) and a closed position (illustrated by solid lines in FIG. 2), and the lock 20 is movable between a locked position and an unlocked position. The position of each of the components is monitored to determine whether the components are in a desired position for a given stage of flight.

Figure 3:
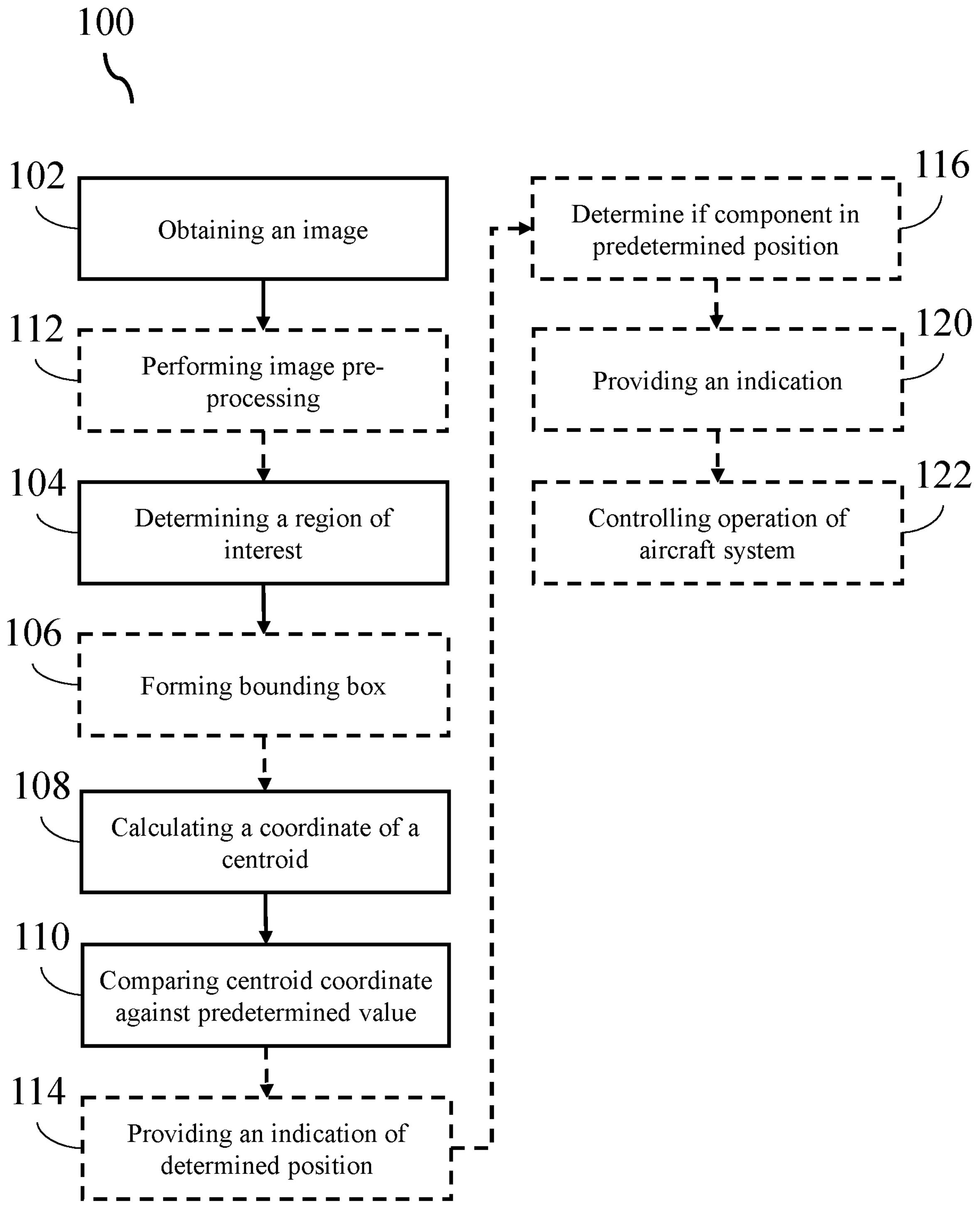
FIG. 3 shows a flowchart of a method of determining a position of a component of the landing gear assembly.

FIG. 3 shows a flow chart of a method 100 of determining a position of a component (such as the tyres 12, the strut 14, the torque link 16, the landing gear bay door 18 and the lock 20) of the aircraft landing gear assembly 10. The method 100 is performed by the aircraft controller 34 and comprises: obtaining 102 an image 40 of the aircraft landing gear assembly 10; determining 104 a region of interest 46 within the image 40, the region of interest containing the component of the aircraft landing gear assembly 10; forming 106 a bounding box 44 around the region of interest 46; calculating 108 a coordinate of a centroid 50 of the region of interest 46; and comparing 110 the coordinate of the centroid 50 against a corresponding predetermined threshold coordinate to determine the position of the component of the aircraft landing gear assembly 10.

Figure 4:
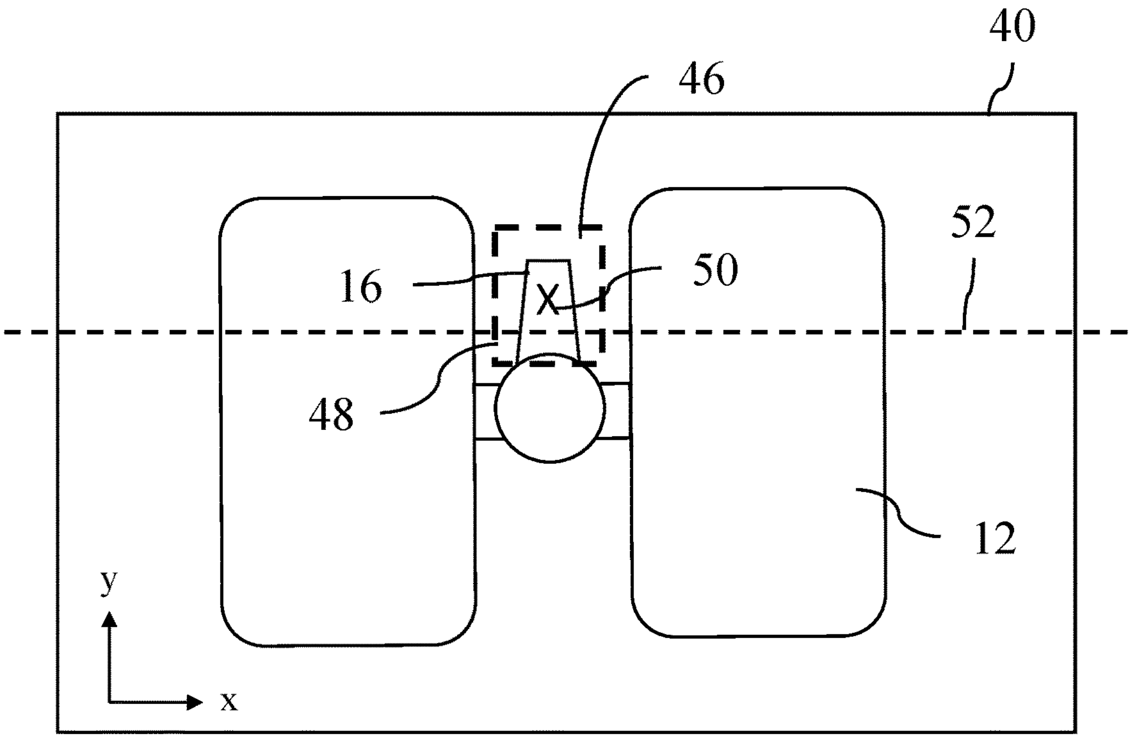
FIGS. 4 to 6 show exemplary images obtained by the method described in the flowchart of FIG. 3.

FIG. 4 shows a schematic view of the image 40 obtained by the method 100, in which the nose landing gear 2 is extended. The image 40 is a plan view of the nose landing gear 2 which is obtained by the imaging device 32 located above the nose landing gear 2 in the landing gear bay. The method 100 of FIG. 3 is used to determine the position of the torque link 16 from the image 40.

After the image 40 has been obtained, the method 100 comprises performing 112 image pre-processing on the image 40. As shown in FIG. 3, the image pre-processing is applied before any further steps of the method 100 are performed. The image pre-processing includes sharpening the image 40 by applying a sharpening filter to the image 40. The image pre-processing is performed to improve the clarity of the image 40, so as to make individual components easier to distinguish within the image 40. In some examples, the image pre-processing includes one or more of: blurring, contrast limited adaptive histogram equalisation and denoising, in addition to or instead of sharpening.

After performing 112 the image pre-processing, the region of interest 46 within the image 40 is determined. The region of interest 46 is a predetermined area around the torque link 16 within the image 40. The region of interest 46 is determined by a machine learning model. The machine learning model is configured to receive the image 40 as an input and provide the region of interest 46 as an output. In other examples, the region of interest 46 is manually determined by a user, or is specified for a particular aircraft landing gear assembly 10.

Machine learning models in the present context may be considered to be the output of a machine learning training process that typically employs a machine learning algorithm that learns from a training dataset. A machine learning model typically comprises both data and procedures that employ the data to process inputs and produce outputs.

The machine learning model used in the examples herein is an artificial neural network or simply a 'neural network'. A neural network includes a number of interconnected nodes, which may be referred to as artificial neurons, or neurons. The internal state of a neuron (sometimes referred to as an "activation" of the neuron) depends on an input received by the neuron. The value of data applied to each input is weighted, summed, and applied to an "activation function" that sums the weighted inputs in order to determine the output of the neuron. The activation function also has a "bias" that controls the output of the neuron by providing a threshold to the neuron's activation. The output of the neuron then depends on the input, weight, bias, and the activation function. The output of some neurons is connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network.

Training of the neural network is important to ensure that a high degree of accuracy is met. Examples of "trainable parameters" of the neural network are the weights, the biases, and the neuron connections that are "learnt", or in other words, capable of being trained, during a neural network "training" process.

The process of training a neural network includes automatically adjusting the weights that connect the neurons in the neural network, as well as the biases of activation functions controlling the outputs of the neurons. The neural network is presented with a training dataset which includes training input data that has a known classification. In the examples herein, the input training data includes images of the aircraft landing gear assembly 10 with known regions of interest. The training dataset is gathered from observations made during previous operations of the aircraft landing gear assembly 10. The training process automatically adjusts the weights and the biases, such that when presented with input data, the neural network accurately provides the corresponding output. While the training described herein is supervised, in other examples the training may be unsupervised (such that only input training data are provided).

Following the determination of the region of interest 46, the bounding box 48 is formed around the region of interest 46. The bounding box 48 is a rectangular box which outlines the region of interest 46 in the image 40. Although the bounding box 48 has a rectangular shape in FIG. 4, in other examples the bounding box has any suitable shape to outline the region of interest 46.

Once the bounding box 48 has been formed, a centroid 50 of the region of interest 46 is calculated. The centroid 50 is the centre point of the region of interest 46 and is described by a coordinate value. As the image 40 in FIG. 4 is a two-dimensional image, the centroid 50 comprises an x-coordinate and y-coordinate (x-axis and y-axis both shown in FIG. 4). In the image 40 of FIG. 4, both the x-axis and the y-axis are in a horizontal plane of the aircraft 1. The image 40 is a plan view of the nose landing gear 2. The y-axis of the image 40 corresponds to a forward direction of the aircraft 1 (e.g. a longitudinal axis of the aircraft), while the x-axis of the image 40 corresponds to a transverse axis of the aircraft 1. Although in this example the centroid 50 is of the region of interest 46, in some examples the centroid 50 is of the bounding box 48.

To determine the position of the torque link 16 from the image 40, the x-coordinate and/or the y-coordinate of the centroid 50 is compared against a threshold coordinate value. The threshold coordinate value is a known value for the landing gear assembly 10 of the aircraft 1, which is determined from previous observations and measurements of the aircraft landing gear assembly 10. If a coordinate of the centroid 50 exceeds the threshold coordinate value, the torque link 16 (and therefore the nose landing gear 2) is in a known position. In FIG. 4, the threshold y-coordinate is shown by dashed line 52. As the y-coordinate of the centroid 50 of the region of interest 46 exceeds this threshold (as it is above the dashed line 52), the torque link 16 is in the extended position. If the y-coordinate of the centroid 50 did not exceed the threshold coordinate, the torque link 16 would not be in the extended position.

Following the determination of the position of the torque link 16, the method comprises providing 114 an indication of the position of the torque link 16 to an operator, such as the flight crew. The indication is provided on the display within the cockpit 4 of the aircraft 1 to inform the flight crew of the determined position of the torque link 16. Based on the indication, the flight crew may determine whether the torque link (or other component of the aircraft landing gear 10) is in the correct position.

Based on the determined position of the torque link 16, the method 100 comprises determining 118 remedial action to be taken. For example, when the aircraft is approaching a runway to land, the nose landing gear 2 is deployed and the torque link 16 is expected to be in the extended position. If the method 100 determines that the torque link 16 is not in the extended position, this may indicate that the nose landing gear 2 has not deployed correctly. In such a situation, the method 100 determines remedial action to be taken to attempt to rectify the situation. The remedial action may include operation of an auxiliary system, such as an auxiliary hydraulic system, to attempt to move the nose landing gear 2 into the correct position. If this is not successful, the remedial action may comprise indicating to the flight crew that the torque link is not in the correct position for landing, and therefore a go-around (i.e. aborted landing) should be carried out.

The determined remedial action is output to the flight crew by providing 120 an indication on the display in the cockpit 4. Based on the output, the flight crew may take the remedial action, or may take other steps deemed necessary (such as confirming the results of the method). In some examples, the remedial action is carried out by the controller 34 operating the relevant systems.

The method 100 also comprises controlling 122 operation of an aircraft system based on the position of the torque link 16. When the method 100 determines that the torque link 16 is in the extended position (indicating that the nose landing gear 2 is extended), the method 100 comprises controlling 122 operation of the aircraft system to lock the nose landing gear 2 in place, to ensure that the nose landing gear 2 remains extended. Similarly, when the method 100 determines that the torque link 16 is in the retracted position (indicating that the nose landing gear 2 is retracted), the method comprises controlling 122 operation of the aircraft system to lock the nose landing gear 2 in place, to ensure that the nose landing gear 2 remains retracted.

In the method 100 shown in FIG. 3, steps shown in dashed boxes are optional. Therefore, in some examples one or more of the steps of forming 106 the bounding box 44 around the region of interest 46, performing 112 image pre-processing, providing 114 the indication of the determined position of the component of the aircraft landing gear assembly 10, determining 116 whether the component is in the predetermined position, determining 118 the remedial action, providing 120 the indication of the remedial action 120 or controlling 122 operation of the aircraft system may be omitted from the method 100.

Figure 5:
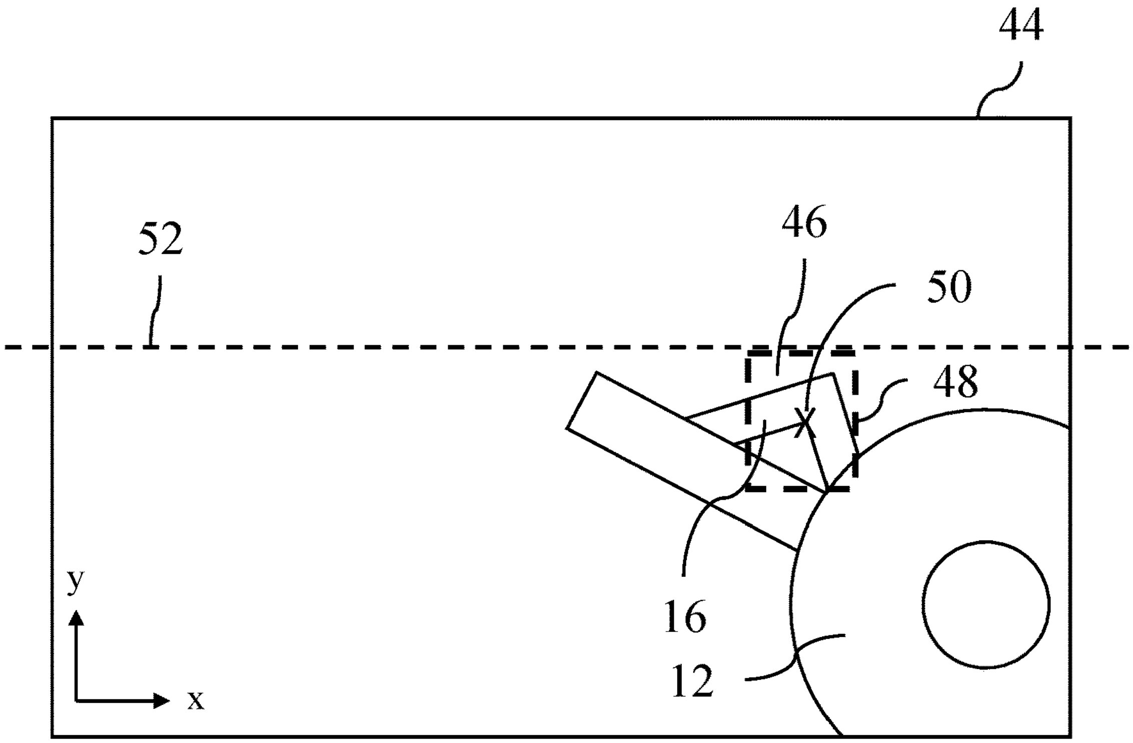
Figure 6:
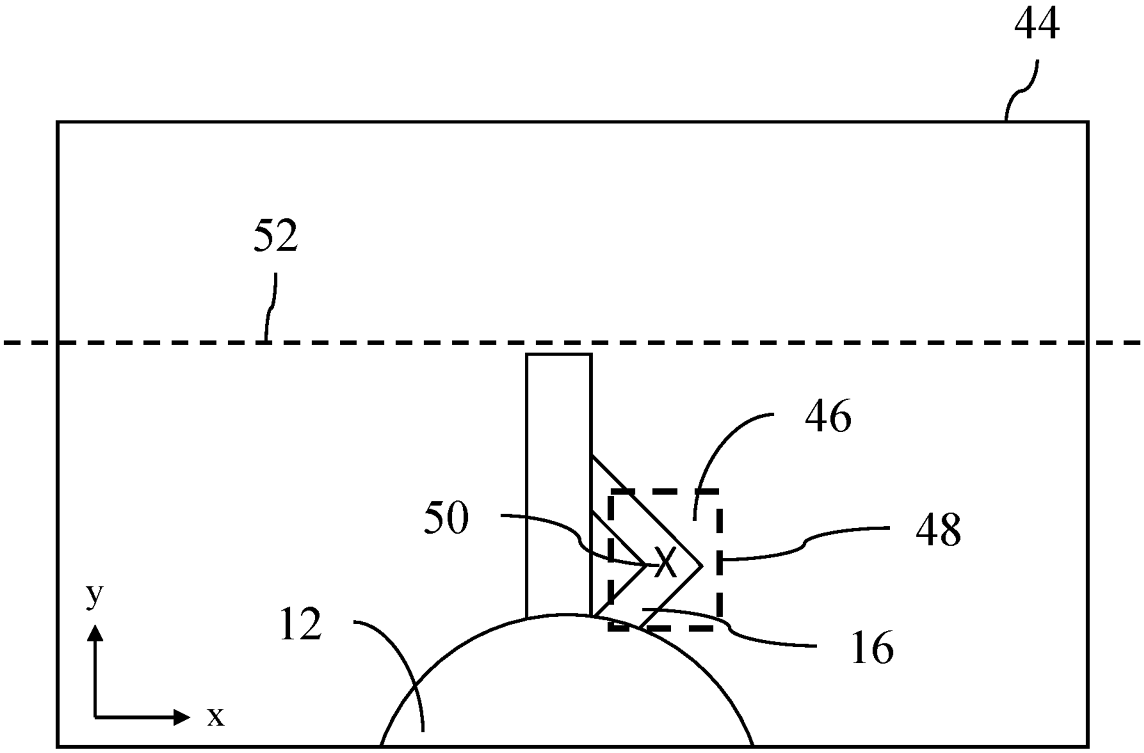

In the examples described above, the position of the component of the aircraft landing gear assembly 10 is determined from a single image 40. As such, the position of the component (in this case the torque link 16) is only known at a single point in time (i.e. when the image was taken). However, it may also be desirable to track movement of the component during operation of the aircraft landing gear assembly 10. This may allow additional information about the movement of the component of the aircraft landing gear assembly to be determined. As such, in some examples the method 100 comprises obtaining a plurality of images of the aircraft landing gear assembly. FIGS. 4 to 6 illustrate example images 40, 42, 44 obtained by the method 100. The images 40, 42, 44 are obtained at time intervals during operation of the aircraft landing gear assembly 10.

FIGS. 4 to 6 show plan views of the aircraft landing gear assembly 10. The images 40, 42, 44 are obtained by the imaging device 32 located above the aircraft nose landing gear 2 in the landing gear bay. The x-axis and y-axis in the images 42, 44 of FIGS. 5 and 6 are the same as the x-axis and y-axis in the image 40 of FIG. 4. As described above, in the image 40 of FIG. 4, the nose landing gear 2 is extended. In the image 42 of FIG. 5 the nose landing gear 2 is partly twisted and retracted, while in the image 44 of FIG. 6 the nose landing gear 2 is fully retracted.

The method 100 described herein is applied to each of the images 40, 42, 44 such that the region of interest 46 of each image 40, 42, 44 is determined. The coordinate of the centroid 50 of the region of interest 46 in each image 40, 42, 44 is calculated and compared against the threshold coordinate value to determine the position of the torque link 16 from each image 40, 42, 44. The y-coordinate threshold value is illustrated in each of FIGS. 4 to 6 by dashed line 52. As illustrated in both FIGS. 5 and 6, the centroid 50 is below the dashed line 52, indicating that the centroid 50 does not exceed the y-coordinate threshold value and therefore the torque link 16 is not in the extended position. In FIG. 4, the centroid 50 is above the dashed line 52, indicating that the centroid 50 exceeds the y-coordinate threshold and that the torque link 16 is in the extended position.

The movement of the region of interest 46 (or the centroid 50 of the region of interest 46) between each of the images 40, 42, 44 is tracked using a CSRT (Discriminative Correlation Filter with Channel and Spatial Reliability) tracker, or other suitable object tracking algorithm.

Monitoring the movement of the region of interest 46 or the centroid 50 (and therefore the component of the landing gear assembly 10) allows information of the health of the landing gear assembly 10 to be determined. For example, it may be possible to determine a rate of movement of the component of the landing gear assembly 10, or it may be possible to monitor the path the component of the landing gear assembly 10 takes. This information is used to determine when the components are not moving as expected, and should be serviced and/or replaced. This may help to reduce downtime of an aircraft and the components may be serviced before they fail/develop significant faults. The data/information relating to the movement of the region of interest 46 is stored on a local memory to allow such data to be analysed at a later point in time (such as by a technician while the aircraft 1 is not in operation). In some examples, the data/information relating to the movement of the region of interest 46 is transmitted to and/or stored at a remote location to allow the data/information to be analysed remote from the aircraft 1. In some examples, the digital camera continually captures images of the aircraft landing gear assembly 10 and stores these on the local memory. These images can be analysed at a later time to determine characteristics of the operation of the aircraft landing gear assembly 10.

In the above-described examples, the component of the aircraft landing gear assembly 10 being monitored is the torque link 16. However, the method 100 is equally applicable to other components of the aircraft landing gear assembly 10.

In some examples, the position of the tyres 12 and/or the strut 14 is determined. The position of the tyres 12 and/or the struct 14 is used to determine whether the nose landing gear 2 is extended or retracted (or neither). In some examples, the position of the landing gear bay doors 18 is determined. The position of the landing gear bay doors 18 is used to determine whether the landing gear bay door 18 is in an open position or a closed position. In some examples, the position of the lock 20 is determined. The position of the lock 20 is used to determine whether the lock 20 is in the locked position (therefore holding the landing gear bay doors 18 and/or the nose landing gear 2 in a locked position) or in the unlocked position (therefore not holding the landing gear bay doors 18 and/or the nose landing gear 2 in place and allowing movement of the landing gear bay doors 18 and/or the nose landing gear 2).

In some examples, the imaging device 32 comprises a lidar system and the image 40 is obtained by scanning the aircraft landing gear assembly with the lidar system. This produces a set of position data points, where each position data point indicates a distance of a feature of the aircraft landing gear assembly 10 from the lidar system. In such examples, the region of interest 46 is a volume and the centroid 50 therefore has three dimensions (an x-coordinate, a y-coordinate and a z-coordinate).

Determining the position of the component of the aircraft landing gear assembly 10 using the method 100 described above may allow the position of the component to be determined in a non-intrusive manner, i.e. without physical interaction between a sensor and the aircraft landing gear assembly 10. This may help to reduce the number of sensors present in the aircraft landing gear assembly and may also reduce the need for physical interaction between sensors and the aircraft landing gear assembly 10. Moreover, when multiple images of the aircraft landing gear 10 are obtained, further properties of the aircraft landing gear assembly 10 may be determined to monitor the health of the aircraft landing gear assembly 10.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the disclosure states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method of determining a position of a component of an aircraft landing gear assembly of an aircraft, wherein the aircraft landing gear assembly is an assembly of components, the method comprising:
- obtaining an image of the aircraft landing gear assembly, wherein the image is generated by an imaging device positioned within a landing gear bay of the aircraft;
- determining a region of interest within the image, the region of interest containing a first component of the components of the aircraft landing gear assembly;
- calculating a coordinate of a centroid of the region of interest;
- comparing the coordinate of the centroid to a corresponding predetermined threshold coordinate, and
- determining a position of the first component of the aircraft landing gear assembly based on the comparison of the coordinate of the centroid to the corresponding predetermined threshold coordinate.

2. The computer-implemented method according to claim 1, further comprising obtaining a plurality of images of the aircraft landing gear assembly in operation and tracking movement of the region of interest shown in the plurality of images, wherein the plurality of images is captured by the imaging device.

3. The computer-implemented method according to claim 2, wherein the tracking movement of the region of interest comprises tracking movement of the coordinate of the centroid between the plurality of images.

4. The computer-implemented method according to claim 1, wherein the position of the first component of the landing gear comprises at least one of: an extended position, a retracted position, an open position, a closed position, a locked position, or an unlocked position.

5. The computer-implemented method according to claim 1, wherein the first component of the aircraft landing gear assembly comprises one of: a torque link, a tire, a landing gear bay door, or a lock.

6. The computer-implemented method according to claim 1, wherein the imaging device includes a digital camera.

7. The computer-implemented method according to claim 1, wherein the obtaining the image of the aircraft landing gear assembly comprises scanning the aircraft landing gear assembly with the imaging device to determine a set of position data points indicative of a distance that features of the aircraft landing gear assembly are from the imaging device.

8. The computer-implemented method according to claim 7, wherein the imaging device is a lidar system and the step of determining the set of position data points comprises scanning the aircraft landing gear using the lidar system to determine the set of position data points.

9. The computer-implemented method according to claim 1, further comprising providing an indication of the position of the first component of the aircraft landing gear assembly to an operator.

10. The computer-implemented method according to claim 1, further comprising controlling operation of an aircraft system based on the position of the first component of the landing gear assembly.

11. The computer-implemented method according to claim 1, further comprising, based on the position of the first component of the aircraft landing gear assembly, determining remedial action to be taken and providing an indication of the remedial action to an operator.

12. The computer-implemented method according to claim 1, further comprising performing image pre-processing to the image of the aircraft landing gear assembly to improve clarity of the image.

13. The computer-implemented method according to claim 1, wherein the determining the region of interest comprises using a machine learning algorithm.

14. An aircraft controller configured to:
- obtain an image of the aircraft landing gear assembly of an aircraft, wherein aircraft landing gear assembly is an assembly of components and the image is generated by an imaging device positioned within a landing gear bay of the aircraft;
- determine a region of interest within the image, the region of interest containing a first component of the components of the aircraft landing gear assembly;
- calculate a coordinate of a centroid of the region of interest;
- compare the coordinate of the centroid to a corresponding predetermined threshold coordinate,
- determine a position of the first component of the aircraft landing gear assembly based on the comparison of the coordinate to the predetermined threshold coordinate; and
- output an indication of the position of the first component of the aircraft landing gear.

15. A system for determining a position of a first component of components forming an aircraft landing gear assembly of an aircraft, the system comprising:
- an imaging device within a landing gear bay of the aircraft; and
- an aircraft controller configured to:
- obtain an image of the aircraft landing gear assembly using the imaging device;
- determine a region of interest within the image, the region of interest containing the first component of the aircraft landing gear assembly;
- calculate a coordinate of a centroid of the region of interest;
- compare the coordinate of the centroid to a corresponding predetermined threshold coordinate, and
- determine the position of the first component of the aircraft landing gear assembly based on the comparison of the coordinate to the predetermined threshold coordinate.

16. The system according to claim 15, wherein the imaging device comprises a digital camera.

17. The system according to claim 15, wherein the imaging device comprises a lidar system and the image comprises a set of position data points indicative of a position from the lidar system.

18. A non-transitory computer-readable storage medium storing instructions that, when executed by an aircraft controller, cause the aircraft controller to carry out the computer-implemented method according to claim 1.

19. An aircraft comprising the aircraft controller according to claim 14.

* * * * *